US012261555B2

(12) United States Patent
Hsiao et al.

(10) Patent No.: US 12,261,555 B2
(45) Date of Patent: Mar. 25, 2025

(54) MOTOR CURRENT OPTIMIZATION CONTROL METHOD AND SYSTEM

(71) Applicant: TECO Electric & Machinery Co., Ltd., Taipei (TW)

(72) Inventors: Chih-Hung Hsiao, Taipei (TW); Hsien-Lai Yu, Taipei (TW)

(73) Assignee: TECO ELECTRIC & MACHINERY CO., LTD., Taipei (TW)

( * ) Notice: Subject to any disclaimer, the term of this patent is extended or adjusted under 35 U.S.C. 154(b) by 127 days.

(21) Appl. No.: 18/329,937

(22) Filed: Jun. 6, 2023

(65) Prior Publication Data

US 2024/0413774 A1 Dec. 12, 2024

(51) Int. Cl.
*H02P 21/00* (2016.01)
*H02P 21/22* (2016.01)

(52) U.S. Cl.
CPC .................................... *H02P 21/22* (2016.02)

(58) Field of Classification Search
CPC ........................................................ H02P 21/22
USPC ..................................................... 318/400.02
See application file for complete search history.

(56) References Cited

U.S. PATENT DOCUMENTS

2008/0297077 A1* 12/2008 Kovudhikulrungsri ...................... H02P 21/22 318/689
2013/0009574 A1* 1/2013 Yoo ......................... H02P 21/22 318/400.02
2014/0292239 A1* 10/2014 Kato ....................... H02P 21/22 318/400.02
2018/0309399 A1* 10/2018 Kitagawa ................ H02P 21/22
2022/0014134 A1* 1/2022 Oono ...................... H02P 21/06

* cited by examiner

*Primary Examiner* — Erick D Glass
(74) *Attorney, Agent, or Firm* — Muncy, Geissler, Olds & Lowe, P.C

(57) ABSTRACT

In a motor current optimization control method and system, while the motor runs steadily at a set speed, one d-axis current command value of the input current is set to 0. Then, the d-axis current command value is step-wisely increased by an increment at least twice. At least three real-time feedback current values can be collected from detecting a feedback current of an AC power. When an instant detected is smaller than the previous detected, the d-axis current command value is increased. When the instant detected is greater than the previous detected, the d-axis current command value corresponding to the previous detected is a minimum feedback current value and is defined as the optimized d-axis current command value. The optimized d-axis current command value is set as the d-axis current command value of the input current to control the motor to keep running steadily at the set speed.

5 Claims, 3 Drawing Sheets

MOTOR CURRENT OPTIMIZATION CONTROL METHOD AND SYSTEM

BACKGROUND OF THE INVENTION

(1) Field of the Invention

The invention relates to a motor current control method and system, and more particularly to a motor current optimization control method and system.

(2) Description of the Prior Art

Generally speaking, while a motor is operated, the output torque can be controlled by adjusting the input current, and the maximum torque can be derived through the equation (1) as follows.

$$Id=\lambda m/(2Lq-2Ld)-\sqrt{(\lambda m^2/(4Lq-4Ld)+Iq^2)} \quad (1)$$

in which Lq and Ld are known inductance values of the motor, λ m is the flux linkage of the permanent magnet motor, Iq is the q-axis current command value, and Id is the d-axis current command value. The Lq, Ld and λm are all known values, while the Iq is a variable. With different input values for the Iq into the aforesaid equation (1), different Id's can be obtained, and thus an optimal Id can be picked.

As described above, though conventionally the Id corresponding to the maximum torque can be derived from the equation (1), yet, since a square root operation is necessary in executing the equation (1), a huge program space would be occupied, and a heavier load upon the microprocessor (MCU) would be inevitable, while the concerned device is processed by the (MCU).

SUMMARY OF THE INVENTION

In view of the aforesaid prior art, the current method for computing the maximum torque of the motor is much more complicate, due that the computing equation would occupy more program space of the microprocessor, and thus a larger load upon the microprocessor would be met. Accordingly, it is an object of the present invention to provide a motor current optimization control method and system that can utilize a more concise method to obtain the output power for achieving the maximum torque, such that the program space of the microprocessor can be relieved without sacrificing the output of the maximum torque.

In the present invention, a motor current optimization control method is configured to optimize an input current to a motor, and includes Step (A) to Step (D) as follows.

Step (A): while the motor is steadily run at a set speed, setting a d-axis current command value of the input current to be 0 initially, increasing step-wisely the d-axis current command value at least twice by an increment, and collecting at least three real-time feedback current values by detecting the feedback current of the motor at each said d-axis current command value.

Step (B): determining step-wisely whether or not an instant detected of the at least three real-time feedback current values is less than a previous detected of the instant detected, and increasing the d-axis current command value by the increment if positive.

Step (C): determining that a recent detected of the at least three real-time feedback current values is larger than a previous detected of the recent detected, defining the previous detected of the recent detected as a minimum feedback current value, and defining the d-axis current command value corresponding to the minimum feedback current value as an optimized d-axis current command value.

Step (D): setting the optimized d-axis current command value as the d-axis current command value of the input current for controlling the motor to keep running steadily at the set speed.

In one embodiment of the present invention, prior to the step (A), further including a step (A0) of utilizing a motor drive to control an AC power according to the set speed, the AC power providing the input current to the motor to steadily operate the motor at the set speed after the motor runs through a warm-up time.

In one embodiment of the present invention, the increment of the step (A) is a product of a percentage increase and a q-axis command value.

In the present invention, a motor current optimization control system, configured for optimizing an input current of a motor provided by an AC power, includes a feedback-current sensor and a motor drive.

The feedback-current sensor is configured to detect a current of the AC power.

The motor drive includes a command generator, a command modulation unit, a comparison unit and a judgment unit.

The command generator, connected electrically with the AC power, is configured to generate a current control command to the AC power, in which the AC power provides the input current to the motor according to the current control command, and the current control command includes a d-axis current command value.

The command modulation unit, connected electrically with the command generator, is configured to control the command generator to generate the current control command according to a set speed. The command modulation unit further sets initially the d-axis current command value of the input current to 0, and then increases step-wisely the d-axis current command value at least twice by an increment. Thus, at least three real-time feedback current values by detecting the feedback current of the motor at each said d-axis current command value can be collected.

The comparison unit, connected electrically with the feedback-current sensor, is configured to receive and compare the at least three real-time feedback current values and to output accordingly a comparison result.

The judgment unit is connected electrically with the comparison unit and the command modulation unit. If the comparison result presents that an instant detected of the at least three real-time feedback current values is less than a previous detected of the instant detected, a command-value increase command for the command modulation unit to increase the d-axis current command value by the increment is generates. If the comparison result further presents that a previous detected of the recent detected, a set command to define the d-axis current command value corresponding to the previous detected of the recent detected as an optimized d-axis current command value is generated, such that the command generator then set the optimized d-axis current command value as the d-axis current command value of the input current according to the set command.

As stated, this invention adjusts step-wisely the d-axis current command value of the input current to obtain the corresponding real-time feedback current value, and, upon when a recent-detected feedback current value is larger than the precious-detected feedback current value, determines the d-axis current command value corresponding to the previous-detected feedback current value as an optimized d-axis current command value. Thereupon, the method and system provided in this invention step-wisely adjusts the d-axis current command value and further detects the corresponding feedback current value, such that the optimized d-axis current command value can be effectively derived. Thus, the program space occupied by the microprocessor can be reduced, and the load upon the microprocessor can be lowered as well. Namely, the object of providing the maximum torque output with less power consumption can be achieved through utilizing this invention.

All these objects are achieved by the motor current optimization control method and system described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a motor current optimization control method and system. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
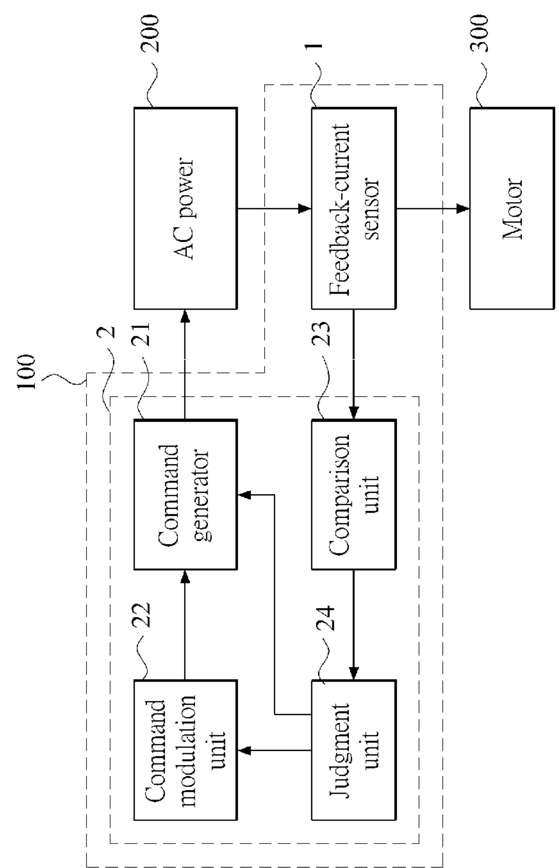
FIG. 1 is a schematic view of a preferred embodiment of the motor current optimization control system in accordance with the present invention.

Referring to FIG. 1, a schematic view of a preferred embodiment of the motor current optimization control system in accordance with the present invention is shown. In this embodiment, the motor current optimization control system 100 is applied to optimize an input current provided to a motor 300 from an AC power 200.

The motor current optimization control system 100 includes a feedback-current sensor 1 and a motor drive 2. The feedback-current sensor 1 is disposed between the AC power 200 and the motor 300. Practically, the feedback-current sensor 1 can be an inductive element.

The motor drive 2 includes a command generator 21, a command modulation unit 22, a comparison unit 23 and a judgment unit 24.

The command generator 21, connected electrically with the AC power 200, is configured for generating a current control command to the AC power 200, so that the AC power 200 can provide the input current to the motor 300 according to the current control command. In this embodiment, the current control command includes a d-axis current command value and a q-axis current command value.

The command modulation unit 22, connected electrically with the command generator 21, is to control the command generator 21 to generate the current control command according to a set speed, and the command modulation unit 22 further set the d-axis current command value of the input current to an initial 0 value, then an increment at a time would be used to gradually increase the d-axis current command value at least twice, such that the feedback-current sensor 1 can detect at least three real-time feedback current values corresponding the d-axis current command values from the initial 0 value and at least two increased values. In this embodiment, the command modulation unit 22 can define the increment by multiplying a q-axis command value with a percentage increase, and the at least three real-time feedback current values include the real-time feedback current value with respect to the initial 0 value of the d-axis current command value, the real-time feedback current value with respect to the d-axis current command value formed by an increment from the initial 0 value, the real-time feedback current value with respect to the d-axis current command value formed by two increments from the initial 0 value, and so forth. When the d-axis current command value is increased again and again by adding the increments, the feedback-current sensor 1 would detect more and more the corresponding real-time feedback current value.

The comparison unit 23, connected electrically with the feedback-current sensor 1, is configured to receive and compare the at least three real-time feedback current values and further to output a comparison result.

The judgment unit 24, connected electrically with the comparison unit 23 and the command modulation unit 22, is configured for receiving the comparison result transmitted from the comparison unit 23, and for generating a command-value increase command to the command modulation unit 22 so as to have the command modulation unit 22 to increase the d-axis current command value by the increment, upon when an instant detected is less than a previous detected while the comparison result contains at least three real-time feedback current values. In addition, the judgment unit 24 would further generate a set command, upon when a recent detected is greater than a previous detected while the comparison result contains at least three real-time feedback current values. The d-axis current command value corresponding to the previous detected with respect to the recent detected would be defined as an optimized d-axis current command value, so that the command generator 21 can set the optimized d-axis current command value as the d-axis current command value for the input current according to the set command.

As described above, practically, in this embodiment, the command generator 21, the command modulation unit 22, the comparison unit 23 and the judgment unit 24 can be arranged in the microprocessor by programming, such that the microprocessor can be operated in a programming manner to demonstrate functions of the command generator 21, the command modulation unit 22, the comparison unit 23 and the judgment unit 24.

Figure 2:
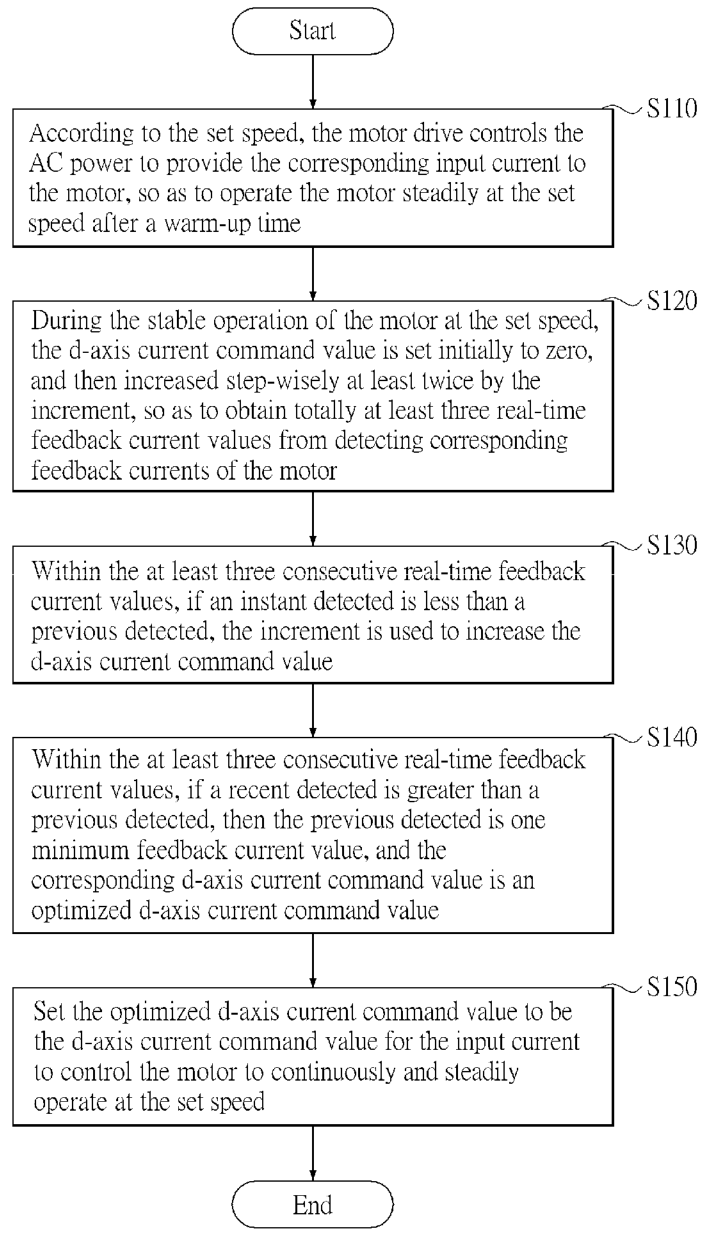
FIG. 2 is a schematic flowchart of a preferred embodiment of the motor current optimization control method in accordance with the present invention.

Referring to FIG. 2, a schematic flowchart of a preferred embodiment of the motor current optimization control method in accordance with the present invention is shown. As illustrated in FIG. 1 and FIG. 2, the preferred motor current optimization control method includes Step S110 to Step S150 as follows, and this motor current optimization control method can be executed particularly through the aforesaid motor current optimization control system 100.

Firstly, in Step S110, according to the set speed, the motor drive 2 controls the AC power 200 to provide the corresponding input current to the motor 300, so as to have the motor 300 able to operate steadily at the set speed after a warm-up time of operation. In this embodiment, the set speed can be a parameter of the motor drive 2 set up by the user or a preset parameter of the motor drive 2, and the warm-up time can be preset in the motor drive 2 or set manually by the user.

In Step S120, during the stable operation of the motor 300 at the set speed, the d-axis current command value of the input current would be set initially to be zero, and then increased gradually at least twice by the same increment at each increase of the d-axis current command value, and correspondingly the feedback current of the motor 300 is detected at each generation of the d-axis current command value so as to obtain totally at least three real-time feedback current values.

In Step S130, within the at least three consecutive real-time feedback current values, if an instant detected is less than a previous detected with respect to the instant detected, then an increment is used to increase the d-axis current command value.

In Step S140, within the at least three consecutive real-time feedback current values, if a recent detected is greater than a previous detected with respect to the recent detected, then the previous detected to the recent detected is one minimum feedback current value, and the d-axis current command value with respect to the minimum feedback current value would be correspondingly an optimized d-axis current command value.

In Step S150, the optimized d-axis current command value is set to be the d-axis current command value for the input current, and is utilized to control the motor to continuously and steadily operate at the set speed.

Figure 3:
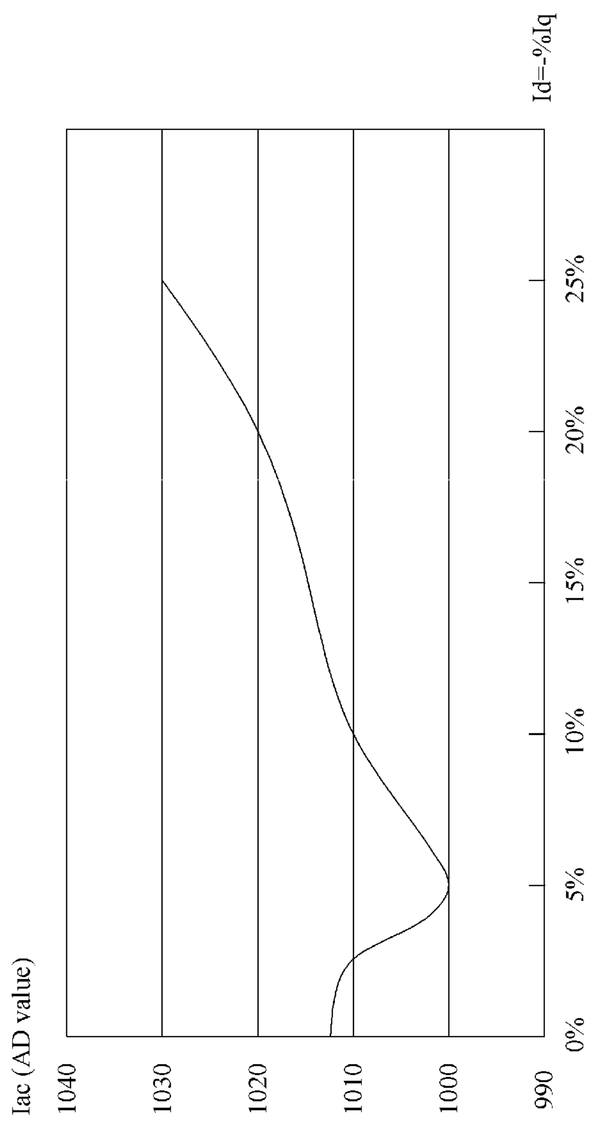
FIG. 3 shows schematically the performance provided by utilizing the embodiments of FIG. 1 and FIG. 2.

Referring to FIG. 3, the performance provided by utilizing the embodiments of FIG. 1 and FIG. 2 is schematically shown. As illustrated from FIG. 1 to FIG. 3, practically, the aforesaid motor current optimization control system 100 and motor current optimization control method can be applied to an air conditioner, and then the motor 300 can be the compressor of the air conditioner.

For example, when the environmental temperature is 24° C., and if the set temperature of the air conditioner is set to 20° C., then, in Step S110, the motor drive 2 would evaluate the set temperature to set the set speed to 35 RPS, and accordingly to determine the rotational speed to control the AC power 200. Thereupon, the AC power 200 can provide the input current to run the motor 300 at 35 RPS, and also allow the motor 300 to operate for a 15-minute warm-up time, such that the motor 300 can keep running steadily at the set speed. In this embodiment, the warm-up time can be a value within 5 to 20 minutes, practically in accordance with user needs.

Then, with respect to Step S120, while the motor 300 runs steadily at the set speed, the d-axis current command value in the input current would be firstly set to be 0. In this embodiment, a share of the q-axis current command value can be defined as an increment for gradually increasing the d-axis current command value at least twice. In addition, at each change of the d-axis current command value, the corresponding real-time feedback current value would be generated by detecting the feedback current of the motor. Thus, for the aforesaid at least three d-axis current command values, at least three real-time feedback current values from detecting the respective feedback currents of the motor would be obtained. In this embodiment, the share of the q-axis current command value is 1% at least, and a relationship between the d-axis current command value and the q-axis current command value can be $Id=-(n/100)*Iq$, in which n is increased from 0.

Practically, as the increment is 2.5%, then the three consecutive d-axis current command values would be 0, 2.5% of the q-axis current command value, 5% of the q-axis current command value, 7.5% of the q-axis current command value, 10% of the q-axis current command value, . . . , etc.

Then, with respect to Step S130 and Step S140, while the d-axis current command value is step-wisely increased from 0 by the increment, the feedback-current sensor 1 would detect individually the at least three real-time feedback current values for the comparison unit 23 to compare and determine whether or not the instant detected is less than the previous detected of the instant detected. While the judgment unit 24 determines that the instant detected is less than the previous detected of the instant detected, the judgment unit 24 would drive the command modulation unit 22 to increase the d-axis current command value by the increment, and further drive the command generator 21 to generate a corresponding current control command for controlling the AC power 200 to adjust the input current. At this time, the feedback-current sensor 1 would correspondingly detect a new real-time feedback current value.

As described above, upon when the comparison unit 23 determines that the instant detected is larger than the previous detected of the instant detected, the d-axis current command value corresponding to the previous detected of the instant detected would be defined as the optimized d-axis current command value, and the increase at the d-axis current command value would be stopped. Thus, while the comparison unit 23 determines that the instant detected is larger than the previous detected of the instant detected, this instant detected would be the recent detected.

Practically, referring to Table 1, correspondences between the real-time feedback current values detected by the feedback-current sensor 1 and the respective step-wise d-axis current command values are demonstrated as follows.

In Table 1, comparisons between the d-axis current command values formed by percentages of the q-axis current command value and the corresponding real-time feedback current values are listed.

| | d-axis current command value obtained by percentage of q-axis current command value (%) | | | |
|---|---|---|---|---|
| | 0% | 2.5% | 5% | 7.5% |
| Real-time feedback current value $I_{AC}$ (Ampere) | 1012 | 1010 | 1000 | 1005 |

As described above, in this embodiment, when the d-axis current command value (formed by a percentage of the q-axis current command value) is 0%, the real-time feedback current value detected by the feedback-current sensor 1 is 1012 ampere. Further, when the d-axis current command value is increased by one increment (2.5% of the q-axis current command value), the real-time feedback current value detected by the feedback-current sensor 1 is 1010 ampere. At this time, the comparison unit 23 would find out that the 1010 ampere is less than 1012 ampere, and thus the judgment unit 24 would drive the command modulation unit 22 to control the command generator 21 to further increase the d-axis current command value to 5% thereof. Simultaneously, the feedback-current sensor 1 would detect that the real-time feedback current value is varied to 1010 ampere. Since the comparison unit 23 would determine that the 1000 ampere is less than 1010 ampere, thus the judgment unit 24 would further drive the command modulation unit 22 to control the command generator 21 to increase the d-axis current command value again to 7.5% thereof, and the feedback-current sensor 1 would detect that the real-time feedback current value is now 1005 ampere. At this time, since the comparison unit 23 determines that the 1005 ampere is larger than the 1000 ampere, then the judgment unit 24 would define the d-axis current command value (5%) corresponding to the 1000 ampere as the optimized d-axis current command value, and further, in Step S150, the optimized d-axis current command value is set to be the d-axis current command value of the input current for controlling accordingly the motor 300 to keep steadily running at the set speed.

As described above, since the motor 300 is steadily operated at the set speed, thus a small value of the real-time feedback current value detected by the feedback-current sensor 1 implies that the instant consumed power would be small as well. Also, when a constant torque is generated due to a stable operation of the motor 300, the small consumed power implies that a larger torque would be generated. Thereupon, by providing the optimized d-axis current command value of this invention, a small consumed power can produce effectively a large torque output, and thereby the energy efficiency of the product can be enhanced.

In summary, in comparison with the current conventional motor system, since the equation for computing the maximum torque in the art would occupy a large program space of the microprocessor, and thus a larger load upon the microprocessor would be generated, the method and system provided in this invention step-wisely adjusts the d-axis current command value and further detects the corresponding feedback current value, such that the optimized d-axis current command value can be effectively derived. Thereupon, the program space occupied by the microprocessor can be reduced, and the load upon the microprocessor can be lowered as well. Namely, the object of providing the maximum torque output with less power consumption can be achieved through utilizing this invention, and thereby the energy efficiency of the product can be substantially enhanced.

While the present invention has been particularly shown and described with reference to a preferred embodiment, it will be understood by those skilled in the art that various changes in form and detail may be without departing from the spirit and scope of the present invention.

What is claimed is:

1. A motor current optimization control method, configured to optimize an input current to a motor, comprising the steps of:

(A) while the motor is steadily run at a set speed, setting a d-axis current command value of the input current to be 0 initially, increasing step-wisely the d-axis current command value at least twice by an increment, and collecting at least three real-time feedback current values by detecting the feedback current of the motor at each said d-axis current command value;

(B) determining step-wisely whether or not an instant detected of the at least three real-time feedback current values is less than a previous detected of the instant detected, and increasing the d-axis current command value by the increment if positive;

(C) determining that a recent detected of the at least three real-time feedback current values is larger than a previous detected of the recent detected, defining the previous detected of the recent detected as a minimum feedback current value, and defining the d-axis current command value corresponding to the minimum feedback current value as an optimized d-axis current command value; and (D) setting the optimized d-axis current command value as the d-axis current command value of the input current for controlling the motor to keep running steadily at the set speed.

2. The motor current optimization control method of claim 1, prior to the step (A), further including a step (A0) of utilizing a motor drive to control an AC power according to the set speed, the AC power providing the input current to the motor to steadily operate the motor at the set speed after the motor runs through a warm-up time.

3. The motor current optimization control method of claim 1, wherein, in the step (A), the increment is a product of a percentage increase and a q-axis command value.

4. A motor current optimization control system, configured for optimizing an input current of a motor provided by an AC power, comprising:

a feedback-current sensor, configured to detect a current of the AC power; and a motor drive, including:

a command generator, connected electrically with the AC power, configured to generate a current control command to the AC power, the AC power providing the input current to the motor according to the current control command, the current control command including a d-axis current command value;

a command modulation unit, connected electrically with the command generator, configured to control the command generator to generate the current control command according to a set speed, the command modulation unit further setting initially the d-axis current command value of the input current to 0 and then increasing step-wisely the d-axis current command value at least twice by an increment, collecting at least three real-time feedback current values by detecting the feedback current of the motor at each said d-axis current command value;

a comparison unit, connected electrically with the feedback-current sensor, configured to receive and compare the at least three real-time feedback current values and to output accordingly a comparison result; and a judgment unit, connected electrically with the comparison unit and the command modulation unit; if the comparison result presents that an instant detected of the at least three real-time feedback current values is less than a previous detected of the instant detected, generating a command-value increase command for the command modulation unit to increase the d-axis current command value by the increment; if the comparison result further presents that a previous detected of the recent detected, generating a set command to define the d-axis current command value corresponding to the previous detected of the recent detected as an optimized d-axis current command value, such that the command generator then set the optimized d-axis current command value as the d-axis current command value of the input current according to the set command.

5. The motor current optimization control system of claim 4, wherein the command modulation unit define the increment as a product of a percentage increase and a q-axis command value.

* * * * *